United States Patent Office 3,497,384
Patented Feb. 24, 1970

3,497,384
PROCESS OF METALIZING CERAMIC SUBSTRATES WITH NOBLE METALS

Francis E. Pirigyi, Wilmington, Del., assignor to E. I. du Pont de Nemours and Company, Wilmington, Del., a corporation of Delaware No Drawing. Filed Aug. 31, 1967, Ser. No. 664,633
Int. Cl. C03c *17/06;* B44d *1/18*
U.S. Cl. 117—229 9 Claims

ABSTRACT OF THE DISCLOSURE

A process fo metalizing a ceramic substrate comprising applying to said substrate a noble metal powder consisting of 60–100% by weight platinum having a surface area within the range of 0.01–1 square meter/grams and optionally, palladium, rhodium, ruthenium, alloys thereof or mixtures thereof, firing the powder at a temperature within the range of 1400–2000° C. to cause the metal powder to form a tightly adherent conductive metal coating on the ceramic substrate. This process does not utilize the conventional inorganic binders to provide adhesion of the metals to the substrate.

BACKGROUND OF THE INVENTION

Metalized ceramics and ceramic-to-metal seals have found wide application in the electronics industry. New uses and applications of these materials sometimes require that the metalized ceramic be vacuum tight and inert to various gaseous atmospheres and yet economical, reliable, relatively easy to fabricate and capable of forming a vacuum tight seal to a metal body.

The current popular metalizing material for alumina ceramic substrates is a molybdenum-manganese powder mixture. This mixture is usually joined to alumina substrates by screen stenciling the powders in a desired pattern and firing in a reducing atmosphere. This metallic film has a rather high resistivity and must be plated with another metal such as nickel or gold, to provide low resistance and brazability when conductive films are desired. The plated molybdenum-manganese films can be joined to metal members of almost any configuration to provide a hermetic seal with good tensile strength. One limitation is that this mixture is most frequently applied to prefired alumina substrates. Furthermore, the entire application process is costly and rather time consuming. A replacement metalization which can be fired in an oxidizing atmosphere and yield highly conductive films is desirable.

Platinium, which is substantially inert to an oxidizing atmosphere, has been applied as a metalizing composition to various ceramic substrates. However, heretofore in the prior art, platinum metalizing has been restricted to low temperature, glass bonded, mechanically weak surface layers fired onto various substrates to obtain a conductive coating.

Accordingly, it is highly desirable to provide a method and material for producing a metalized surface on a ceramic body that may be used in high temperature oxidizing atmospheres and yield highly conductive films. Also, it is highly desirable to provide a method and material for producing a metalized surface on a ceramic body which can be bonded to a metallic body in an air atmosphere to produce a hermetic seal. More particularly, there is great need for a method of applying a platinum metalizing layer on an alumina-containing ceramic substrate in air to produce highly conductive metallic films.

SUMMARY OF THE INVENTION

This invention relates to a method of metalizing a surface of a ceramic substrate comprising applying to said surface a finely divided noble metal powder consisting essentially of platinum having a surface area within the range of 0.01–1 square meters/gram, and optionally, a metal selected from the group consisting of palladium, rhodium, ruthenium, alloys thereof and mixtures thereof, the platinum comprising from 60–100% by weight of said noble metal powder, heating the substrate and applied powder to a temperature within the range of 1400–2000° C. to cause the powder to form a tightly adhering conductive metal film on the ceramic substrate.

The process of this invention does not possess these previously described disadvantages caused by the prior art metalizations. Consequently, this new process, which utilizes particularly metalizing compositions, is useful in printing electrodes in monolithic capacitors and for use with other organic bonded, unfired ceramic substrates.

DESCRIPTION OF THE PREFERRED EMBODIMENTS

More specifically, this invention relates to a method of bonding a thin conductive film to a ceramic substrate comprising dispersing a finely divided noble metal powder with an inert liquid vehicle, said powder consisting essentially of platinum having a surface area within the range of 0.01–1 square meters/gram, and optionally, a metal selected from the group consisting of palladium, rhodium, ruthenium, alloys thereof and mixtures thereof, the platinum comprising from 60–100% by weight of said noble metal powder, applying the resultant dispersion on the substrate in the form of a substantially thin film, heat treating the substrate and film in air until the vehicle is substantially completely driven off, and thereafter further heat treating the substrate and film at a temperature from about 1400° C. to about 2000° C. until the metal powder is firmly bonded to the substrate.

One very important aspect of this invention lies in the use of "coarse" platinum powders having a very specific surface area, within the range of 0.01–1 square meters/gram. Platinum powders having this surface area can be prepared in accordance with the process described in the pending application Ser. No. 649,858, filed June 29, 1967, now abandoned. It has been found that the "coarse" platinum powders used in the process of this invention must have a surface area, as measured by the nitrogen or krypton absorption within the range of 0.01–1 square meters/gram in contrast to the usual platinum "blacks" which have a surface area of 30 or more square meters/gram (0.3 square meters/gram is equivalent to 1 micron diameter and 30 square meters/gram is equivalent to 0.01 micron diameter assuming spherical particles). Common platinum "black" powders, being of very fine particle size, do not provide highly continuous films which exhibit a high degree of conductivity or which solder well when used in the process of this invention. In addition, the strength and adherence of these films is much lower than those prepared with gray, coarse platinum. It as also been observed that coarse platinum produces highly reliable hermetic seals. It is, therefore, very important that platinum powders having a surface area within the range of 0.01–1 square meters/gram be utilized in the process of this invention.

It is pointed out that the terminology "consisting essentially of platinum having a surface area within the range of 0.01–1 square meters/gram" does not exclude the presence of minor amounts (i.e., less than 50%) of finer or coarser platinum. For example, a platinum powder containing 80% of 0.3 square meters/gram platinum and 20% of 30 square meters/gram platinum is within the scope of this invention.

The other noble metals. excluding platinum, should be in finely divided powder form, i.e., sufficiently finely divided to pass through a 325 mesh (U.S. Standard Sieve Scale) screen, said powder having particles no larger than about 40 microns. Those having average particle sizes ranging from 0.01–10 microns are preferred.

The noble metal powder which is utilized must contain platinum, and optionally, at least one metal of the group consisting of palladium, rhodium, ruthenium, alloys thereof and mixtures thereof. The platinum must comprise from 60–100% by weight of the noble metal powder. Correspondingly, up to 40% by weight of a metal selected from the group consisting of palladium, rhodium, ruthenium, alloys thereof and mixtures thereof may be present in the noble metal powder. The use of more than 40% by weight of the supplementary noble metal(s) undesirably affects the properties of the ultimate noble metal film (e.g., adhesion, solderability, conductivity). The preferred noble metal mixture contains 70–95% by weight platinum and 5–30% by weight of the supplementary noble metal(s).

The temperature at which the process of this invention is carried out is generally within the range of about 1400° C. to about 2000° C. The temperature must be high enough to securely and firmly bond the metals to the ceramic substrate without melting the noble metal powder or noble metal powder mixture. It is preferred that the bonding or firing temperature be within the range of 1500° C. to about 1700° C.

The invention is further illustrated by the following examples. In the examples and elsewhere in the specification, all parts, ratios and percentages of materials or components are by weight.

EXAMPLE I

100% Pt

A noble metal powder containing 8 grams of gray platinum powder (0.3 square meters/gram) was dispersed in a vehicle consisting of 30% hydrogenated rosin, 6% ethyl cellulose, 16% high-flash naphtha and 48% kerosene. The weight ratio of metal powder to vehicle was 80% metals and 20% vehicle. This metalizing composition was printed by screen stenciling techniques on a prefired alumina substrate and slowly heated to 1200° C. to drive off the vehicle. The substrate and metallization were subsequently fired in a gas/air furnace to 1600° C. The result was conductive, highly adherent film which had a resistance of 10 milliohms per square; the film also exhibited good visual coverage, soldered well and accepted a massive gold braze.

EXAMPLE II

100% Pt

A similar metalizing composition was prepared and printed in accordance with Example I except that platinum "black" was used instead of the platinum gray. The platinum "black" had a surface area of 30 square meters/gram. The resulting metal film was badly fissured, possessed a resistance of 125 milliohms per square, displayed discontinuity in same areas, soldered poorly and exhibited low adherence to the substrate. Thus, in comparison with the gray platinum, the finer platinum powders produce significantly inadequate results.

EXAMPLE III

95% Pt/5% Pd

A mixture containing 7.6 grams of gray platinum powder (0.3 square meters/gram) and 0.4 gram of palladium powder (3 square meters/gram) were dispersed in a vehicle consisting of 30% hydrogenated rosin, 6% ethyl cellulose, 16% high flash naphtha and 48% kerosene. The weight ratio of metal powder to vehicle was 80% metals and 20% vehicle. This metalizing composition was printed by screen stencil techniques on a prefired alumina substrate and heat treated to 1200° C. to drive off the vehicle. The substrate and metalization were subsequently fired in a gas/air furnace to 1600° C. The result was a conductive, highly adherent film which had a resistance of 20 milliohms per square, exhibited good visual coverage, soldered well and accepted a massive gold braze.

EXAMPLE IV

90% Pt/10% Pd

A mixture containing 7.2 grams of gray platinum powder and 0.8 gram of palladium powder were combined as described in Example III. The result was a bonded conductive film which had a resistance of 30 milliohms per square, exhibited good visual coverage and soldered well.

EXAMPLE V

90% Pt/10% Ru

A mixture containing 3.6 grams of gray platinum and 0.4 gram of ruthenium "black" were dispersed in an inert vehicle as described in Example III. This metalizing composition was printed onto an unfired alumina substrate, heat treated to 1200° C., and then fired to 1550° C. The result was a conductive film having a conductivity of 15 milliohms per square and possessing good adherence qualities.

EXAMPLE VI

95% Pt/5% Ru

A mixture containing 3.8 grams of gray platinum powder and 0.2 gram of ruthenium "black" were dispersed in an inert vehicle, printed and fired, as described in Example V. The result was a conductive film having good conductivity, adherence, coverage and solderability.

EXAMPLE VII

80% Pt/20% Ru

A mixture containing 3.2 grams of gray platinum powder and 0.8 gram of ruthenium "black" were dispersed in an inert vehicle, printed and fired, as described in Example V. The result was a conductive film having good conductivity, adherence, coverage and solderability.

EXAMPLE VIII

60% Pt/40% Ru

A mixture containing 2.4 grams of gray platinum powder and 1.6 grams of ruthenium "black" were dispersed in an inert vehicle, printed and fired, as described in Example V. The result was a conductive film having good conductivity, adherence, coverage and solderability.

EXAMPLE IX 99.5% Pt/0.5% Rh

A metalizing composition containing 7.96 grams of gray platinum and 0.04 gram of rhodium "black" were prepared as in Example III. The result produced a conductive film which had a resistance of 10 milliohms per square, good adherence and coverage.

EXAMPLE X

90% Pt/10% Rh

A metalizing composition containing 7.2 grams of gray platinum and 0.8 gram of rhodium "black" were prepared as in Example III. The result produced a conductive film which had a resistance of 20 milliohms per square, good adherence and coverage.

The metalizing compositions which are applied to the ceramic substrates usually, although not necessarily, will be dispersed in an inert vehicle to form a paint or paste. The proportion of vehicle to metal may vary considerably depending upon the manner in which the paint or paste is to be applied and the kind of vehicle used. Generally, from 1–20 parts by weight of solids per part by weight of vehicle will be used to produce a paint or paste of the desired consistency. Preferably, 3–6 parts of solids per part of vehicle will be used.

In preparing the metalizing compositions, any inert liquid may be utilized as the vehicle. Water or any one of the various organic liquids, with or without thickening and/or stabilizing agents, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resins, such as the polymethacrylates of lower alcohols, or solutions of ethyl cellulose, in solvents such as pine oil and the monobutyl ether of ethylene glycol monoacetate. The vehicles of copending application Ser. No. 617,855, filed Feb. 28, 1967, may also be used. The vehicle may contain or be composed of volatile liquids to promote fast-setting after application; or it may contain waxes, thermoplastic resins or the like materials which are thermofluids.

The metalizing compositions can be printed and fired on various types of ceramic substrates including those composed of forsterite, steatite, barium titanate, berylia, alumina, porcelain, fused quartz, sapphire, and calcined clay. Any other conventional ceramic substrates may be utilized, but this invention is particularly applicable to alumina-containing substrates and especially those which contain at least 90% by weight alumina.

I claim:

1. A method of metalizing a surface of a ceramic substrate comprising applying to said surface a finely divided noble metal powder consisting essentially of platinum having a surface area within the range of 0.01–1 square meters/gram, and optionally, a metal selected from the group consisting of palladium, rhodium, ruthenium, alloys thereof and mixtures thereof, the platinum comprising from 60–100% by weight of said noble metal powder, heaitng the substrate and applied mixture of powders to a temperature within the range of 1400–2000° C. to cause the powder to form a tightly adhering conductive the metal mixture is firmly bonded to the susbtrate.

2. A method in accordance with claim 1 wherein the noble metal powder consists essentially of platinum and ruthenium.

3. A method of bonding a thin conductive film to a ceramic substrate comprising dispersing a finely divided noble metal powder in an inert liquid vehicle, said mixture consisting essentially of platinum having a surface area within the range of 0.01–1 square meters/gram, and optionally, a metal selected from the group consisting of palladium, rhodium, ruthenium, alloys thereof and mixtures thereof, the platinum comprising from 60–100% by weight of said noble metal powder, applying the resultant dispersion on the substrate in the form of a substantially thin film, heat treating the substrate and film in air until the vehicle is substantially completely driven off, and thereafter further heat treating the substrate and film at a temperature from about 1400° C. to about 2000° C. until the metal mixture is firmly bonded to the substrate.

4. A method in accordance with claim 3 wherein the ceramic substrate contains at least 90% by weight alumina.

5. A method in accordance with claim 3 wherein the ceramic substrate is sapphire.

6. A method in accordance with claim 4 wherein the ceramic substrate is unfired prior to the bonding process.

7. A method in accordance with claim 3 wherein the noble metal powder consists essentially of platinum and ruthenium.

8. A method in accordance with claim 3 wherein the noble metal powder consists essentially of about 95 weight percent platinum and about 5 weight percent palladium.

9. A method in accordance with claim 3 wherein the noble metal powder consists essentially of about 99.5 weight percent platinum and 0.5 weight percent rhodium.

References Cited

UNITED STATES PATENTS

| | | | |
|---|---|---|---|
| 3,079,282 | 2/1963 | Haller et al. | 117—227 X |
| 3,099,575 | 7/1963 | Hill | 117—22 X |
| 3,207,706 | 9/1965 | Hoffman | 117—227 X |
| 3,289,291 | 12/1966 | Reed | 106—1 X |
| 3,380,835 | 4/1968 | Short | 117—227 X |
| 3,385,799 | 5/1968 | Hoffman | 117—227 X |
| 3,440,062 | 4/1969 | Hoffman | 117—227 X |
| 3,440,182 | 4/1969 | Hoffman | 106—1 X |

ALFRED L. LEAVITT, Primary Examiner

J. R. BATTEN, Jr., Assistant Examiner

U.S. Cl. X.R.

106—1; 117—22, 160, 212, 229; 252—514